Patented Aug. 31, 1948

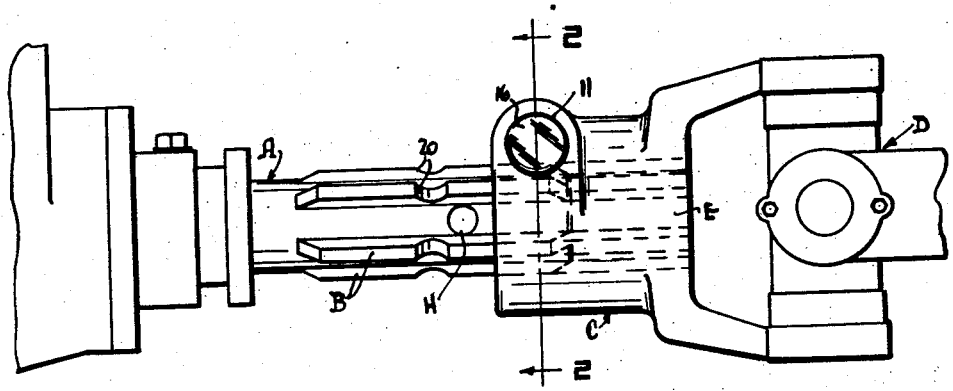
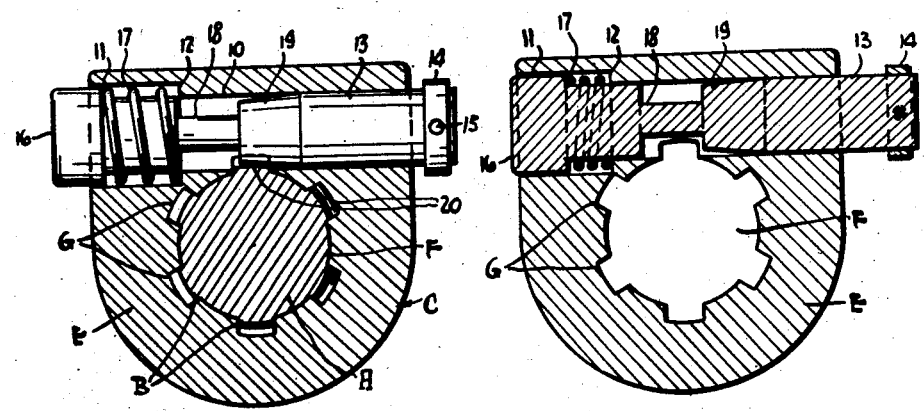

2,448,278

UNITED STATES PATENT OFFICE 2,448,278

POWER TRANSMISSION COUPLING

Martin Ronning, St. Louis Park, Minn., assignor to Minneapolis-Moline Power Implement Company, Minneapolis, Minn., a corporation of Delaware Application September 21, 1944, Serial No. 555,080

4 Claims. (Cl. 287—52)

1

This invention relates generally to power transmission couplings and more particularly to that type of mechanism for this purpose wherein a coupling sleeve or tubular member is releasably and non-rotatably engaged with a power shaft.

As one example of such coupling I disclose herein a tractor power take off shaft, and a portion of a universal joint by which connection is made to the shaft for driving various implements. As conventionally used the shaft is splined and the coupling sleeve is secured thereon by a bolt passing diametrically through the sleeve and shaft. Safety requirements dictate that a connection of this kind be protected by a guard, and it is found that the average tractor user, after once removing the guard as is necessary in order to remove the bolt, will then frequently leave the guard off of the machine. The coupling is then exposed and sometimes causes injury to the user.

It is the primary object of my invention, therefore, to provide a locking means by which a coupling sleeve of this or similar nature may be secured to the shaft and positively locked against endwise displacement, and which locking means may be manually operated to disconnect the coupling without interference from any surrounding guard. It is thus possible for the user to attach the coupling to the shaft or disconnect it therefrom without removing the guard.

Another object is to provide locking means of this nature which is simple and positive and in which the locking engagement with the shaft is caused to be under constant spring pressure when in use to thereby prevent any possibility of disengagement.

Still another object is to provide locking means which may be applied to a tractor power take off shaft without any alteration thereof whatsoever.

With these and other objects in view the invention resides in the novel construction and arrangement of parts as hereinafter set forth and claimed, reference being had to the accompanying drawings wherein:

Fig. 1 is a side elevation of a shaft and coupling embodying my invention, the coupling being shown as in process of mounting on the shaft.

Fig. 2 is an enlarged cross section along the line 2—2 in Fig. 1, and showing the coupling locked on the shaft by the locking means of my invention.

Fig. 3 is a view similar to Fig. 2 but showing the locking means itself in the position to which it is moved by hand to release the coupling from the shaft, and with the shaft omitted.

2

Referring now more particularly and by reference characters to the drawings, A represents generally a shaft which may be the power take off shaft of a tractor and which, as shown, is conventionally splined to provide the feathers or keys B. Associated with the shaft is a coupling member C which may be a part of a universal joint D, and which includes a sleeve portion E having a recess F provided with longitudinal grooves G to non-rotatably receive the splined shaft.

Ordinarily the coupling C is secured against axial displacement on the shaft A by means of a bolt (not shown) inserted diametrically through appropriate holes in the sleeve and shaft. The hole for this bolt in the shaft A is indicated at H. As stated heretofore, mechanisms of this nature are usually enclosed by a guard which is not here shown, but which so closely surrounds the coupling that its removal is necessary in order to reach the bolt with a tool, and to withdraw it from the coupling when the same is to be disconnected.

To avoid this and the necessity for removing the guard, I provide the locking means now to be described. To accommodate such means the coupling sleeve portion E is provided with a bore 10 which extends therethrough transversely from side to side and which intersects the recess F, or more particularly, one of the grooves G therein, as best seen in Figure 2. The bore 10 is thus substantially tangent to the circular recess, and at one end the bore is counterbored to the larger diameter as indicated at 11, forming an annular shoulder 12. Mounted in the bore is a locking member or pin designated generally at 13 and which has its major portion of a diameter such as to nicely engage the bore. At one end the pin is provided with a stop collar 14 secured thereto by a diametrically extending pin 15 and which collar, as noted in Figure 2, limits endwise movement of the pin 13 in one direction. The opposite end of the pin is diametrically enlarged to form a head 16 which may nicely enter the counterbore 11. Braced between this head 16 and the aforesaid shoulder 12 is an expansion coil spring 17 which loosely surrounds the pin and which, as will be obvious, normally urges the pin to the left as viewed in the drawing, until such movement is halted by the stop means 14.

Intermediate its ends the pin 13 has a diametrically reduced portion or neck 18, and adjacent thereto the pin is tapered or beveled as indicated at 19. In the normal position of the pin as urged by the spring 17, this tapered portion 19 of the pin spans that portion of the bore 10 which intersects the groove G. However, by pushing with the thumb upon the head 16 the pin may be urged endwise so that the reduced portion 18 substantially clears the groove G as seen in Figure 3. It is in the latter position of the pin that the coupling may be slipped on to the shaft A as will be clearly evident.

The shaft A is conventionally provided with a series of arcuate recesses 20 in the spline keys B, and with the pin held under thumb pressure in the position of Figure 3, the coupling may be moved onto the shaft A until the pin 13 comes in alignment with any one of the recesses 20. When the pressure is then released, the spring 17 will move the pin endwise in the bore 10 until the tapered portion 19 engages one of the recesses 20, whereupon the coupling is securely locked against axial displacement with respect to the shaft. It will be apparent, however, that this locking engagement may be readily disengaged by hand by simply moving the pin in the opposite direction and that the coupling may then be removed. Attention is called to the fact that when the pin 13 is in engagement with the recess 20 of the shaft A the stop means 14 stands in spaced relation to the adjacent side of the coupling, as clearly shown in Figure 2. Thus the pin is under constant spring pressure such that the tapered portion 19 of the pin has a persistent wedging engagement with the recess 20. Thus not only is the connection firmly held, but wear is compensated for to increase the useful life of the locking means.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. The combination with a coupling having a recess adapted to non-rotatably receive a shaft, of means for locking the coupling and shaft against relative axial displacement, comprising a locking pin mounted for endwise movement crosswise in the coupling in a plane intersecting one side of the recess in the coupling, said pin having a reduced portion movable into registry with the recess to permit the insertion of the shaft thereinto, said pin also having a locking portion adjacent said reduced portion adapted to normally traverse the recess in the coupling, and said shaft having a recess in at least one side adapted for engagement by said locking portion of the pin and the said locking portion of the pin being beveled for wedgewise engagement with said recess in the shaft, and the pin being spring set to urge said beveled portion of the pin tightly into and against said shaft recess.

2. Locking means for a coupling having a recess to non-rotatably and telescopically receive a shaft, comprising a locking pin, said coupling having a bore extending crosswise with respect to the shaft recess and intersecting the same in substantially tangent relation thereto, the said pin being mounted in the bore for endwise movement therein and having stop means at one end for limiting such movement in one direction, a spring operatively arranged to urge the pin endwise until halted by the stop means, the other end of the pin being exposed for manual operation to urge the pin endwise against the spring, the said shaft having a recess in one side, and the pin having a tapered portion adapted to engage the said recess in the shaft to lock the coupling against endwise movement on the shaft.

3. Locking means for a coupling having a recess to non-rotatably and telescopically receive a shaft, comprising a locking pin, said coupling having a bore extending crosswise with respect to the shaft recess and intersecting the same in substantially tangent relation thereto, the said pin being mounted in the bore for endwise movement therein and having stop means at one end for limiting such movement in one direction, a spring operatively arranged to urge the pin endwise until halted by the stop means, the other end of the pin being exposed for manual operation to urge the pin endwise against the spring, the said shaft having a recess in one side, the said pin having a tapered portion to engage the recess in the shaft, and said stop means being so located and arranged that the endwise movement of the pin by the spring when the coupling is on the shaft is halted by the wedging engagement of the said tapered portion of the pin with the shaft recess to provide a constant spring tension in such engagement.

4. A rotary drive coupling comprising, an inner member, an outer member having an aperture adapted to slidably receive the inner member, said members being splined to prevent relative rotation, a locking pin slidably mounted in the outer member in a position to tangentially intersect said aperture, said pin having a reduced portion which, when the pin is in a predetermined longitudinal position, will permit relative axial movement of the inner and outer members, said inner member having a lateral recess adapted to be engaged by the pin, when the latter is in another longitudinal position, to lock the inner member against axial movement with respect to the outer member, and a spring yieldably holding the pin in its locking position, the said pin having a beveled part for wedging engagement with the splined part of the inner member under the action of said spring to rigidly lock the inner and outer members with respect to each other.

MARTIN RONNING

REFERENCES CITED

The following references are of record in the file of this patent:

UNITED STATES PATENTS

| Number | Name | Date |
| --- | --- | --- |
| 302,519 | Parsons | July 22, 1884 |
| 608,448 | Gauthier | Aug. 2, 1898 |
| 1,404,260 | Arnold | Jan. 24, 1922 |
| 1,496,630 | Hendrickson | June 3, 1924 |
| 1,833,236 | Smith | Nov. 24, 1931 |
| 1,990,990 | Hathorn | Feb. 12, 1935 |
| 2,278,698 | Green | Apr. 7, 1942 |